June 11, 1940.                W. J. NIGHTINGALE                2,204,377
                           AUTOMOBILE DECKING DEVICE
                         Filed Dec. 20, 1934        2 Sheets-Sheet 1
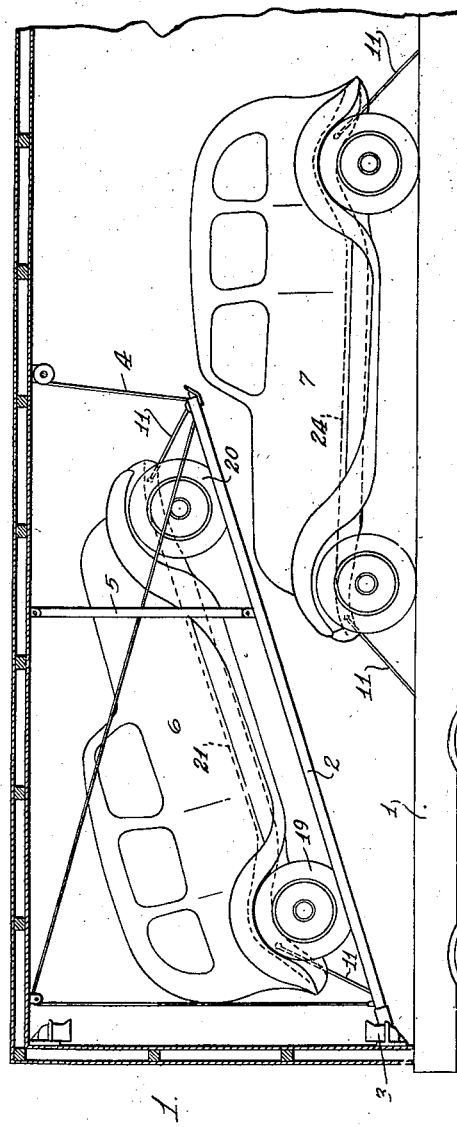
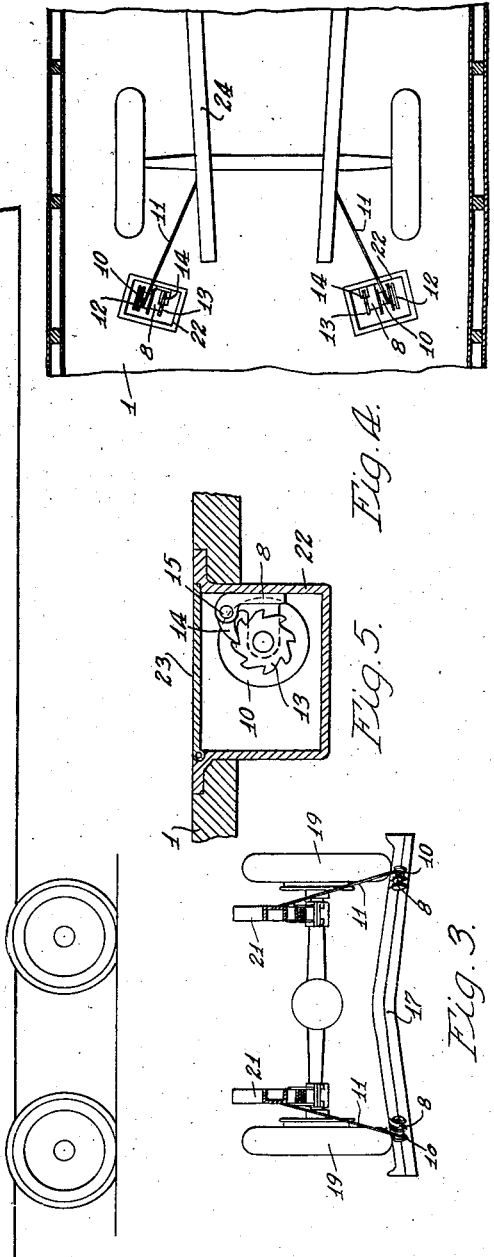
INVENTOR
William J. Nightingale
BY
ATTORNEYS June 11, 1940.   W. J. NIGHTINGALE   2,204,377
AUTOMOBILE DECKING DEVICE
Filed Dec. 20, 1934   2 Sheets-Sheet 2
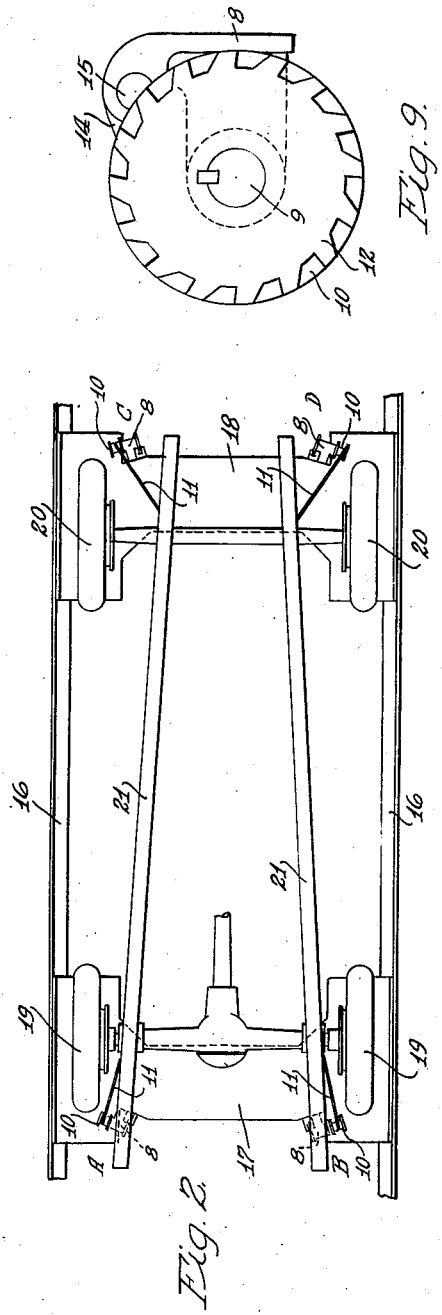
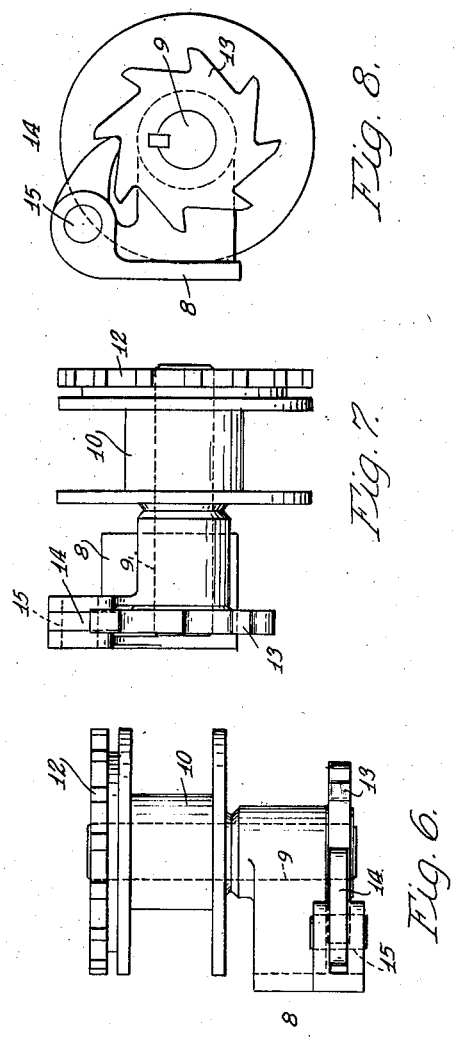
INVENTOR
William J. Nightingale
BY
ATTORNEYS Patented June 11, 1940

2,204,377

UNITED STATES PATENT OFFICE 2,204,377

AUTOMOBILE DECKING DEVICE

William J. Nightingale, Flint, Mich., assignor, by mesne assignments, to H. J. Forster, trustee for the Association of American Railroads Application December 20, 1934, Serial No. 758,378

2 Claims. (Cl. 105—368)

The present invention pertains to a novel hold down device particularly adapted for anchoring automobiles in transporting vehicles, such as freight cars.

In the shipment of automobiles in freight cars it is common practice to support some of the automobiles directly on the floor of the freight car and to support at least one automobile, by means of a decking device, in an angular position and spaced upwardly above the floor. This procedure has been found practical because the length of a freight car is not exactly divisible by the length of the automobiles and by supporting an automobile above the floor in an angular position at least one more automobile than would otherwise be possible may be loaded in the freight car without exceeding the weight limitations. Due to the shocks and jolts received by the freight car during travel and switching it is necessary to securely anchor the automobiles against movement relative to the freight car, or the decking device, and it is a primary object of the present invention to provide a hold down or anchoring means which may be used to anchor the automobile relative to the floor of the freight car and relative to the decking device in the freight car.

An important object of the present invention is to provide a hold down device which attaches to the frame of an automobile and in so doing eliminates the damage which has been found to occur when hold down devices are attached to the axles, to the springs, or to the wheels of the automobile. A major percentage of the weight of an automobile is directly carried by the frame, and because this weight in turn is supported on the axles and wheels through springs the weight is movable, both laterally and longitudinally, relative to the axles and wheels. Therefore, when the freight car receives shocks and jolts the present anchoring means holds the major percentage of the weight of the vehicle against movement whereas previous devices of the type mentioned leave the heavier parts of the vehicle free to move on the springs, with the result that the torque transmitting parts which connect driving elements carried on the frame to the rear axle are often damaged when the major percentage of the weight of the vehicle is thrown against such parts. By securing the frame against movement and leaving the wheels free to roll, if for any reason there should be any tendency for them to do so, the automobile is anchored so that it may be subjected to any nature of shocks or jolts within the limitations of the mechanical strength of the anchoring means, without the torque transmitting parts of the automobile being damaged, such being the case because at no time is the weight of the body, engine, transmission, etc., thrown against the propeller shaft which is connected to the rear axle while the said rear axle is held immovable as was heretofore the practice.

Another important object of the present invention is to provide an arrangement of the anchoring means which automatically centers the automobile relative to the decking device for supporting the same. For this purpose the decking device is provided with convex supports for the wheels and a pair of anchoring devices are mounted on each support. The anchoring devices of each pair are attached to the frame to exert a downward force in opposed angular directions, the direction of each force being downwardly and outwardly relative to the longitudinal axis of the frame of the automobile. The anchoring devices at opposite ends are also arranged so that they exert a downward and outward force relative to the transverse axis of the frame.

The provision of inclined wheel supports in combination with the novel manner of attaching the hold down devices to spring supported parts of the automobile forms a meritorious feature of the invention. It acts to restrain the road wheels of the automobile from lateral play while in transit and thus preserves the bearings and other parts of the wheel constructions from damage. The fact that the wheels are permitted a slight freedom of movement and at the same time are restrained from extensive lateral play enables the bearings of the wheels to distribute the load over different parts of their surfaces, thus preventing the bearings from being flattened at one point as a result of the shocks and jolts suffered in transit.

Still another important object of the present invention is to so mount the anchoring means which is employed to secure an automobile relative to the floor of a freight car so that the anchoring means does not damage the floor of the car and permits the use of the car for shipping other merchandise or parts after the automobile has been removed and without the necessity of removing the anchoring device.

With the above and other ends in view the invention is more particularly set forth and claimed, reference being had to the accompanying drawings, in which Figure 1 is a cross section of a freight car illustrating automobiles secured on a decking device therein and to the floor thereof;

Fig. 2 is a plan of the decking device illustrating the chassis of an automobile secured thereon;

Fig. 3 is an end elevation corresponding with Fig. 2;

Fig. 4 is a fragmentary plan of an automobile chassis secured to the floor of the freight car;

Fig. 5 is a cross section of the floor of a freight car illustrating an anchoring device assembled therein;

Fig. 6 is a plan of one of the anchoring devices;

Fig. 7 is a front elevation thereof, and

Figs. 8 and 9 are opposite end elevations.

Like characters of reference are employed throughout to designate corresponding parts.

The numeral 1 designates the floor of a freight car having a platform 2 with one end received in brackets 3 and the other end suspended above the floor 1 by means of cables 4 and link members 5. On the platform 2 is received an automobile 6 while another automobile 7 is illustrated as resting upon the floor 1. The present invention relates to the means for securing the automobile 6 on the platform 2 and to the means for securing the automobile 7 to the floor 1.

Each of the anchoring devices comprises a bracket 8 adapted to be secured by bolts or rivets to a supporting structure in a manner to be described. In the bracket 8 is rotatably journalled a shaft 9 whose ends project outwardly from opposite sides of the bracket. On one of the projecting ends of the shaft 9 is keyed a drum 10 having a cable 11 with one end secured thereto so that upon rotation of the drum the cable is caused to be wound around the drum. Formed integral with or secured to the drum 10 is a notched disk 12 for the purpose of receiving a wrench so that manual pressure may be applied to the disk to rotate the drum to cause the cable 11 to be wound around the same. On the other projecting end of the shaft 9 is keyed a ratchet wheel 13 and a pawl 14 is pivotally mounted as at 15 on the bracket 8 to cooperate with the ratchet wheel 13 in preventing rotation of shaft 9 and drum 10 in one direction.

The decking device or platform 2 is shown by way of example as comprising two longitudinally extending members 16 joined together by cross members 17 and 18 adapted to receive and support the rear wheels 19 and front wheels 20 respectively of the automobile 6. Anchoring devices are secured at A and B on the cross member 17 and at C and D on the cross member 18 and have their respective cables 11 connected to adjacent points on the frame 21 of the automobile. The anchoring devices at A and B are so arranged that the cables 11, when tightened on their drums, exert a downward force and at the same time an angular force which is opposed to a similar angular force exerted by the cables and drums at C and D. The opposed angular disposition of the cables at opposite ends of the platform 2 securely lashes the frame 21 relative to the platform and prevents longitudinal movement of the automobile. In order to prevent lateral movement of the automobile the cables at A and B are also inclined outwardly relative to the frame so that the forces set up thereby angularly oppose each other as more clearly illustrated in Fig. 3. The cables at C and D are likewise angularly opposed to each other in order to prevent lateral displacement of that end of the automobile.

In order to provide additional insurance against lateral shifting of the automobile the cross members 17 and 18 are arched as more clearly shown in Fig. 3. This arched support for the vehicles causes the automobile to automatically center itself relative to the platform when the cables 11 are drawn tight.

In order to secure the automobile 7 relative to the floor 1 a pair of anchoring devices is provided at each end of the automobile and are mounted in casings 22 which are imbedded in the floor 1 and which have a hinged cover 23. In this instance the arrangement or disposition of the anchoring devices is such that the cables extend downwardly from their point of attachment to the frame 24 and at the same time extend angularly in both a longitudinal and lateral direction.

Although a specific embodiment of the present invention has been illustrated and described it is to be understood that various changes may be made in the details of construction without department from the spirit of the invention as set forth in the appended claims, and such changes are contemplated.

What I claim is:

1. In combination with a transporting conveyance and an automobile having springs and a spring supported chassis frame and body, a decking frame in said conveyance having wheel supports adapted to receive the wheels of the automobile and support the automobile thereby, a plurality of anchoring devices each secured to said frame opposite each corner of the automobile and each provided with a flexible tensioning element connected to an adjacent section of the chassis frame of the automobile to draw the body down upon the spring supports and hold the automobile to the decking frame while the wheels thereof are left free for a slight rolling movement on said wheel supports, said wheel supports being inclined laterally in such a manner tending to force the lower part of each wheel outwardly from the vehicle.

2. An automobile decking frame for raising and supporting automobiles comprising, in combination, a base frame having means thereon in positions to receive and support the road wheels of an automobile, tensioning means on said frame adapted to be connected to the automobile thus supported to hold the same down upon said wheel supporting means of the frame, said wheel supporting means being inclined to the normal plane of contact of the road wheels of an automobile and so arranged relative to one another that the wheel supporting means on one side of the frame are inclined opposite to those on the other side whereby when an automobile is supported upon said decking frame, the road wheels thereof are prevented from extensive lateral play by the inclined character of the supporting means therefor.

WILLIAM J. NIGHTINGALE.